Sept. 4, 1934.  E. V. COLLINS  1,972,703
PLANTER ATTACHMENT FOR VEHICLES
Filed Feb. 16, 1931   2 Sheets-Sheet 1
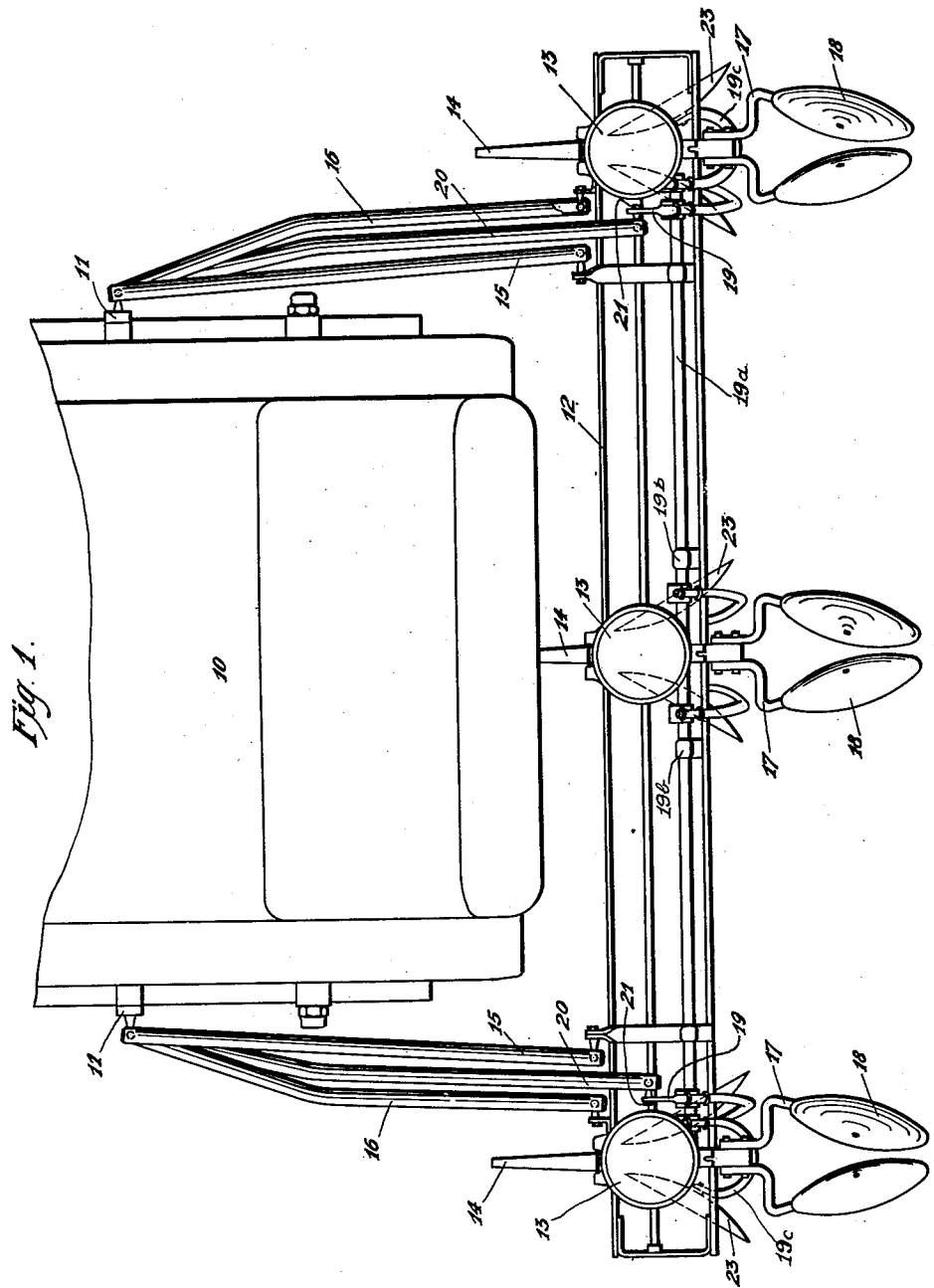
Inventor
Edgar V. Collins
by Orwig & Hague Attys.

Sept. 4, 1934.  E. V. COLLINS  1,972,703
PLANTER ATTACHMENT FOR VEHICLES
Filed Feb. 16, 1931  2 Sheets-Sheet 2
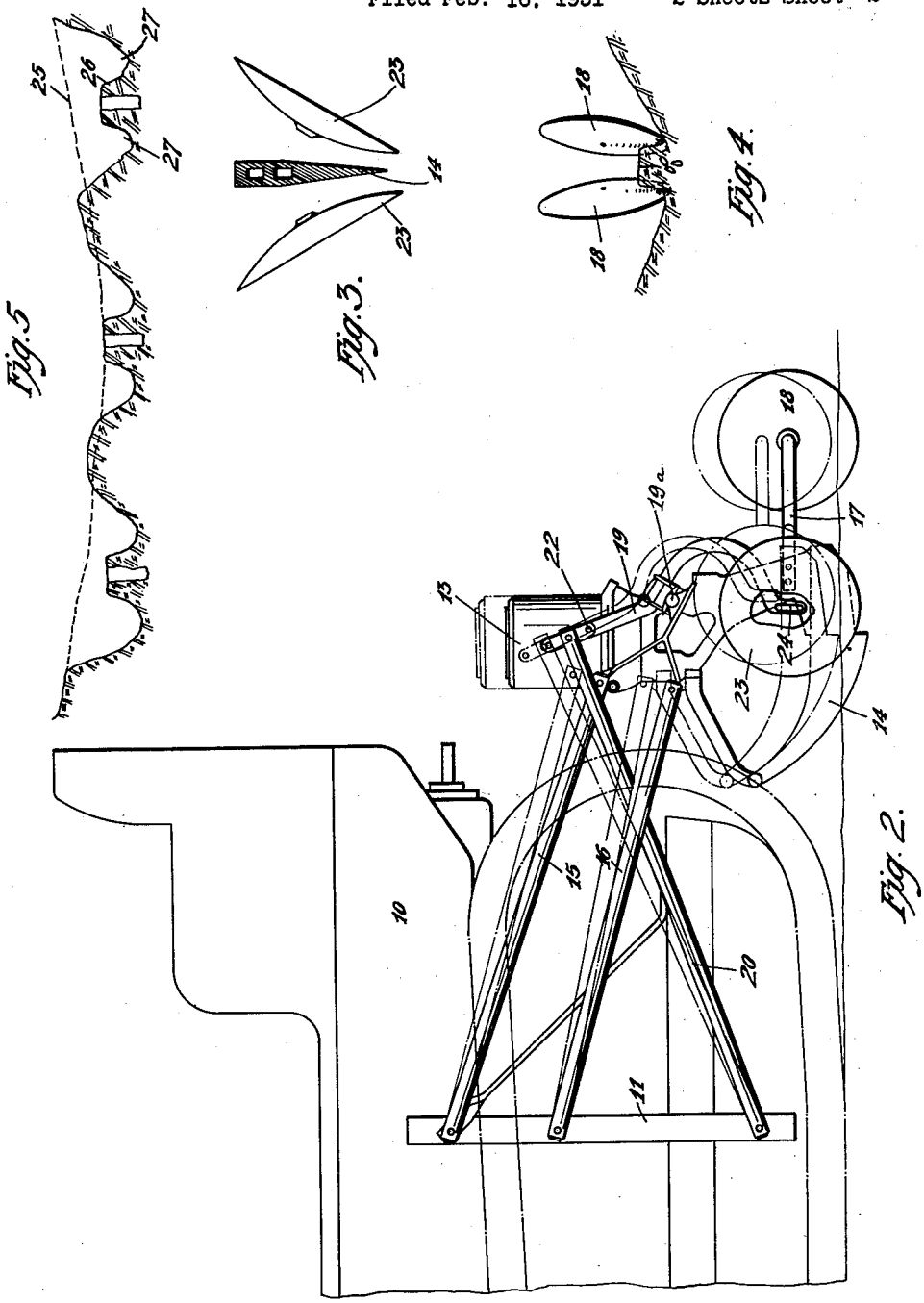
Inventor
Edgar V. Collins
by Orwig & Hague Attys.

Patented Sept. 4, 1934

1,972,703

UNITED STATES PATENT OFFICE 1,972,703

PLANTER ATTACHMENT FOR VEHICLES

Edgar V. Collins, Ames, Iowa

Application February 16, 1931, Serial No. 516,028

7 Claims. (Cl. 97—47)

The object of my invention is to provide a planter of the three row type designed to be drawn behind a vehicle such as a tractor, and in which the depth at which the seeds are planted is controlled by furrow opening disks arranged close to the sides of the planter runner, and which cause the planter to be raised or lowered automatically in accordance with the contour and condition of the soil at the point of planting, as distinguished from planters in which the depth of the planting is controlled by supporting wheels or the like located at a distance from the point of planting and which governs the depth of the planting only by the surface contour over which the wheels are passing.

A further object is to provide a planter of this class of greatly simplified and inexpensive construction, and of light weight.

A further object is to provide a planter of this character in which the depth at which the seeds are planted may be readily and easily regulated by the operator.

A further object is to provide an improved means for packing the soil about the seeds after they are planted, by pressure of the soil against the sides as well as the top of the seeds after they are planted, to thereby thoroughly pack the soil close to the seeds on all sides.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a portion of a tractor with my improved planter attached thereto.

Figure 2 shows a side elevation of same.

Figure 3 is a top view showing a horizontal section through a planter runner, and also showing the two furrow opening disks arranged at the sides thereof.

Figure 4 shows a section of soil in which seeds have been planted, and a front elevation of the two soil packing disks in position for packing the soil against the seeds from the sides; and Figure 5 illustrates a section of the soil as would appear after the planter had opened the furrow ready to deposit seeds. The dotted line in said figure illustrates the surface of the soil before a planter has run over it.

Referring to the accompanying drawings, I have used the reference numeral 10 to indicate a tractor or other vehicle. On the sides of the tractor near the rear are two upright supporting bars 11 secured to the tractor.

The planter comprises a rigid frame 12 to which are fixed three planters of ordinary construction, and indicated generally by the numeral 13, and each is provided with a furrow opening runner 14 of ordinary construction.

For attaching the planter frame to the bars 10 I have provided on each side of the vehicle parallel bars 15 and 16, pivotally connected with the planter frame by ordinary ball and socket joints, and also pivotally connected to the planter frame by ball and socket joints.

By means of this construction the planter may move up and down through a path of travel of considerable length, and at the same time always stand in approximately vertical positions, which is desirable for use in connection with check row planters. This construction permits the planter frame to swing laterally to a limited extent, and this lateral swinging movement may be manually operated by means not herein shown.

Fixed to the rear of each planter are two arms 17 extended rearwardly and each is provided at its rear end with a disk 18 of ordinary construction. These disks are arranged with their convex surfaces toward each other, and they are inclined slightly upwardly and away from each other and rearwardly and away from each other. These disks function as follows:

After a furrow has been opened and the seeds dropped therein, these disks enter the soil at the sides of this furrow and press the soil laterally and downwardly about the seeds, thus insuring that the furrow will be completely filled up, and that the soil is packed around and close to the seeds.

For the purpose of controlling the depth at which the seeds are planted, I have provided for each planter a lever 19. This lever is fixed to a shaft 19a which is rotatively mounted in bearings 19b on the frame 12. This lever has its upper end projected upwardly and forwardly and pivotally connected to a fulcrum bar 20, which fulcrum bar is extended downwardly and forwardly and attached to the supporting bar 11. The connection between the lever 19 and the fulcrum bar 20 is made adjustable by having the bolt 21 which supports the ball and socket joint capable of being placed in any one of the openings 22 in the lever 19. The lower end of this lever 19 is curved downwardly and outwardly, and then forwardly, and has attached to it a furrow opening disk 23. A second arm 19c is fixed to the shaft 19a and supports another disk 23. These disks are arranged at opposite sides of the planter, and with their forward edges inclined toward each other to thereby throw the soil laterally away from the planter runner. These disks are adjustably mounted on the lever and arm by being bolted into the slots 24.

In practical use and assuming that the planter is being advanced by a tractor over a previously prepared seed bed, the weight of the planter will be sufficient to cause the runner to penetrate the ground surface to a depth greater than that desired for planting the seeds. The depth of the planting, however, is controlled by the furrow opening disks. Under ideal conditions these disks will penetrate the soil just far enough to permit the runner to open a furrow and plant the seeds at the desired depth.

In the event, however, that the planter should pass over the portion of soil that is relatively soft and light, then the disks will penetrate it a little deeper and the soil will accumulate in front of the disks and tend to prevent their rotation, thus causing a greater resistance to be presented to the advance of the disks, and when this is done, the disks move the lower end of the lever 19 rearwardly, which causes the lever 19 to move about its fulcrum point on the fulcrum bar 20, and thus elevate the planter pivoted to the center of the lever, and hold the planter in this elevated position until the resistance applied to the disk has lessened, whereupon the weight of the planter will cause it and the disks to again move downwardly.

When a condition of the soil occurs in which the soil is relatively hard, then there will be a minimum accumulation of the soil in front of the disks, and the disks will rotate freely and operate with a minimum of resistance, which together with the weight of the planter is sufficient to open the furrow the desired depth.

When the planter approaches a raised portion on the land surface, the increased resistance to the advance of the disks causes them to instantly move rearwardly and upwardly, and thus elevate the planter, and when the planter enters a depression in the ground surface, the decreased resistance to the advance of the disks permits the weight of the planter to at once lower the planter into the depression.

Adjustments may be made to suit varying conditions of the soil surface, first by moving the furrow opening disks up and down in the slots 24, and second by changing the point of adjustment between the levers 19 and the fulcrum bars 20.

When the bar 20 is pivoted to the upper opening in the lever 19, the lever is relatively lengthened and a relatively greater amount of power applied to the disks 18 will be necessary to raise the planter a given distance, whereas if the fulcrum bar 20 is pivoted to the lever in the lower opening 22, then the lever is relatively shortened and a less amount of power applied to the disks 18 will raise the planter.

In practice I have found it unnecessary in a three row planter to have independent supporting means for each planter, and this greatly simplifies the construction and cheapens the cost of the device.

In Figure 5 I have illustrated the manner in which the seeds are planted to a uniform depth in a three row planter of rigid construction, even though the ground surface over which the planter is passing is substantially higher at its sides than at its central portion. In this figure the dotted line 25 is used to indicate the surface of the ground before the planter has passed over it. When the planter passes over it, the furrow opening disks on the outer planters will cut into the surface more deeply than those on the central planter, and there will be a ridge left between the furrows opened by each pair of disks 18. These ridges are indicated at 26 and the furrows at 27.

By this means it will be seen that the tops of the ridges 26 are substantially in line and hence the runner 14 will penetrate each to substantially the same depth.

I claim as my invention:

1. A planter attachment for vehicles comprising a planter, means for connecting it to a vehicle, said means being so designed as to permit the planter to freely move up and down, a lever pivoted to the planter, a tool at the lower end of the lever, and a fulcrum bar pivoted to the upper end of the lever and designed to be attached to the vehicle.

2. A planter attachment for vehicles comprising a planter, means for connecting it to a vehicle, said means being so designed as to permit the planter to freely move up and down, a lever pivoted to the planter and extended forwardly and upwardly, a tool at the lower end of the lever, and a fulcrum bar pivoted to the upper end of the lever and designed to be attached to the vehicle.

3. A planter attachment for vehicles comprising a planter, means for connecting it to a vehicle, said means being so designed as to permit the planter to freely move up and down, a lever pivoted to the planter and extended forwardly and upwardly, a tool at the lower end of the lever, and a fulcrum bar pivoted to the upper end of the lever extended downwardly and forwardly and designed to be attached to the vehicle.

4. A planter attachment for vehicles comprising a planter, means for connecting it to a vehicle, said means being so designed as to permit the planter to freely move up and down, a lever pivoted to the planter, a pair of furrow opening disks at the lower end of the lever, and a fulcrum bar pivoted to the upper end of the lever and designed to be attached to the vehicle.

5. A planter attachment for vehicles comprising a planter, two substantially parallel links pivoted to the planter and designed to be pivoted at their forward ends to the vehicle for holding the planter in a substantially upright position during its up and down movements, a lever pivoted to the planter, a tool at the lower end of the lever, and a fulcrum bar pivoted to the upper end of the lever and designed to be attached to the vehicle.

6. A planter attachment for vehicles comprising a frame, a number of planters fixed to the frame, a pair of substantially parallel links pivoted to each end portion of the frame and extended forwardly and designed to be pivoted to the vehicle, the pivotal connection of the links to the frame being formed to permit lateral movement of the frame relative to the vehicle, a lever pivoted to each planter, a tool at the lower end of each lever, two fulcrum bars at opposite ends of the frame, means for pivotally connecting them to the upper end of each of said levers, and means whereby their forward ends may be connected to the vehicle.

7. In an earth working device to be drawn by a vehicle, the combination of an implement, an earth working tool associated with the implement, means for connecting said implement to a vehicle and for guiding its movements upwardly and downwardly relative to the vehicle, and means for automatically and jointly raising and lowering the implement and earth working tool comprising a lever pivoted to the tool and also pivoted to the implement, and a movable fulcrum device for the lever designed to be attached to a vehicle, said parts being so arranged that pressure in a rearward direction upon said tool will cause said lever and its fulcrum device to move both the tool and the implement upwardly.

EDGAR V. COLLINS.